United States Patent
Bolzer et al.

(10) Patent No.: US 7,178,686 B2
(45) Date of Patent: Feb. 20, 2007

(54) ROTATIONALLY MOLDED SUBTERRANEAN TANK WITH RISER

(75) Inventors: Todd Bolzer, Jonesboro, AR (US); Jeffrey T. Rogers, Lincoln, NE (US)

(73) Assignee: Snyder Industries, Lincoln, NE (US)

( * ) Notice: Subject to any disclaimer, the term of this patent is extended or adjusted under 35 U.S.C. 154(b) by 588 days.

(21) Appl. No.: 10/055,440

(22) Filed: Jan. 23, 2002

(65) Prior Publication Data

US 2003/0136789 A1 Jul. 24, 2003

(51) Int. Cl.
*B65D 88/76* (2006.01)
(52) U.S. Cl. .................................. 220/567.1
(58) Field of Classification Search ............. 220/567.1, 220/295, 298; 52/20
See application file for complete search history.

(56) References Cited

U.S. PATENT DOCUMENTS

| | | | |
|---|---|---|---|
| 2,218,188 A * | 10/1940 | Wittenberg | 220/298 |
| 4,036,249 A | 7/1977 | Perry, Sr. et al. | |
| 4,172,799 A | 10/1979 | Perry, Jr. | |
| 4,187,647 A * | 2/1980 | Hall | 52/20 |
| 4,217,933 A | 8/1980 | Perry, Jr. et al. | |
| 4,254,885 A | 3/1981 | Fouss et al. | |
| 5,207,463 A * | 5/1993 | Seizert et al. | 292/256.6 |
| 5,316,930 A | 5/1994 | Loesch-fries et al. | |
| 5,361,930 A | 11/1994 | Perry | |
| 5,525,007 A * | 6/1996 | Jones et al. | 405/52 |
| 6,047,724 A | 4/2000 | Nurse, Jr. | |
| 6,328,890 B1 | 12/2001 | Thibault | |
| 2002/0153380 A1 | 10/2002 | Wade | |
| 2002/0185433 A1 | 12/2002 | Perry | |

OTHER PUBLICATIONS

Jun. 2000 Catalog of AK Industries, Inc.
Fralo Plastech; Septech Tanks: Innovative Plastic Technology (2 pgs).

* cited by examiner

*Primary Examiner*—Stephen Castellano
(74) *Attorney, Agent, or Firm*—Hovey Williams LLP

(57) ABSTRACT

A subterranean tank assembly is provided which broadly includes a vessel, a cover, and a riser which is configured to permit the riser to be adjusted in axial length at the job site. The riser is configured to permit coupling of the cover to the topmost connector portion thereof and to a portal of the vessel. The riser includes a plurality of substantially parallel, axially spaced circumferentially extending flanges which mate with the rim of the portal surrounding the opening, whereby the flanges may be fastened to the vessel in lengths intermediate to the initial length of the riser without the necessity of altering the tank or the cover.

4 Claims, 5 Drawing Sheets

ROTATIONALLY MOLDED SUBTERRANEAN TANK WITH RISER

BACKGROUND OF THE INVENTION

1. Field of the Invention

The present invention is broadly concerned with subterranean tanks for receiving sewage or serving as a cistern for holding water which are rotationally molded of synthetic resin material. More particularly, the present invention is concerned with a tank of the foregoing type provided with parabolic wall construction and a portal arrangement for accomodating a uniquely and complementally configured cover or a synthetic resin riser which is constructed in such a manner that it may trimmed in multiple locations along its axial length while retaining wall strength and the ability to couple to the tank and receive a cover thereon.

2. Description of the Prior Art

As used in this application, "subterranean tank" refers to vessels for containing liquid which are intended to be substantially completed covered with earth so as to lie below grade. These subterranean tanks are commonly used in residential and light commercial construction in suburban and rural areas where the tanks are used as a septic tank for receiving sewage and wastewater, or as a cistern for holding water for agricultural, commercial or household use. These tanks have long been constructed of concrete or metal. These tanks are generally heavy and difficult to transport and install. Over time, the concrete tanks may crack or leak, and the metal tanks may corrode. Thus, attempts have been made to develop a practical and suitable subterranean tank out of synthetic resin which is durable, lightweight and economical to produce, while being able to withstand the soil pressures and overloads as well as impacts caused by machinery and the like inherent in their use. Among the various approaches taken by the prior art is that shown and described in U.S. Pat. No. 4,254,885. This patent discloses a subterranean tank having a plurality of wall corrugations and an arched top wall, and a depression for the ingress and egress of liquids.

While the construction of subterranean tanks has been advanced by this design, in many instances there has developed a need to bury the tanks significantly below grade due to ambient temperatures, the conformation of the earth surface, or other factors. In these circumstances, it is necessary to be able to gain access to the interior of the tank from the surface for such purposes as repair or pumping of the contents of the tank. Rather than specifically configure the tank to the site, a riser is often employed to compensate for the depth of the tank while permitting access to the opening through the riser. One such riser is shown, for example, in U.S. Pat. No. 6,047,724. The riser shown and described in that patent employs a corrugated wall construction and engagement structure for permitting a plurality of risers to be connected in tandem, one atop the other. In this way, the bottom portion of the riser may be connected to the tank at the opening of the latter or to similarly constructed risers therebelow, and the top portion of the riser being adapted to receive a cover or to connect to the bottom portion of a similar riser placed thereon.

While the riser shown in U.S. Pat. No. 6,047,724 is designed for use with other risers to provide a suitable depth or height adjustability, it does not admit for adjustments in height less than the axial length of the riser. That is to say, the construction of riser of the U.S. Pat. No. 6,047,724 necessitates that risers of a variety of different lengths be available on site to permit the cover to be placed at grade level as each riser is of a definite length and not capable of adaptation to the differences of depth as the tank is buried and covered with earth discoverable only after installation is complete.

Furthermore, the covers used with the tanks of this type have traditionally been of concrete or metal which are both expensive and heavy. There has thus developed a need for a cover having increased structural strength and durability, and a cover which facilitates positioning and coupling to either an opening on the tank itself or to a riser positioned thereon.

SUMMARY OF THE INVENTION

Applicant has thus recognized a need for a subterranean tank and riser assembly with greater adaptability to height variances at the site, for a tank assembly which provides improved durability and insulating qualities, for a vessel having consistency of wall thickness throughout, for improved load transfer regarding the weight of the earth over the vessel after it is buried, for a lightweight but structurally enhanced cover, for a complemental fitting between the cover and the vessel or riser which promotes positioning of the cover and securement to either the vessel or a riser, and for isolated inlet and outlet passages. These needs have been largely met by the subterranean tank and riser of the present invention.

The subterranean tank hereof broadly includes a vessel having spaced and isolated inlet and outlet passages and at least one and preferably a plurality of openings, a cover having upper and lower walls, and a riser especially configured for ease of attachment to the vessel and to the cover and having radially extending substantially horizontal flanges to enable trimming of the riser wall to various intermediate lengths but still enabling the remaining portion of the riser to receive the cover and couple to the tank opening. The vessel may be advantageously formed by rotational molding whereby a vessel wall of substantially capacity (e.g., 1500 gallons) may be formed in a single molding operation, and has a vessel wall which is of a corrugated, substantially parabolic shape which includes a plurality of ribs. The parabolic shape of the vessel wall is preferably provided both along the upper wall in a substantially transverse direction to the longitudinal axis and in the end walls in the longitudinal direction. The ribs alternate with arcuate, substantially flat surfaced vessel wall sections, the ribs being oriented substantially transverse to the longitudinal axis of the vessel along the arcuate top wall portion and in parallel planes to the longitudinal axis at the opposite axially spaced ends of the vessel. The rounded ribs are designed to maximize the modulus of the wall, and the large radii of the ribs enable the vessel to be rotationally molded with a uniform and consistent wall thickness. The arcuate, and most preferably parabolic top wall portion is preferably provided with portals surrounding and defining openings adjacent each end wall section at the highest part of the top wall portion to receive the covers thereon, and the vessel may be provided with a divider permanently fused to the vessel wall in the interior liquid receiving chamber oriented transverse to the longitudinal axis to divide the chamber into two compartments. The portals preferably including frustoconical rims which both help to distribute loads placed on the cover and limit stress concentrations as well as facilitating receipt of the covers thereon.

The cover is provided of double walled construction for improving durability, leak resistance and thermal insulating properties. The cover includes a plurality of circumferentially spaced, radially inwardly projecting lugs for bayonettype locking engagement with receptacles on the rim of the vessel surrounding the opening. Further, the cover most preferably is provided with a plurality of circumferentially spaced depressions in the upper wall to facilitate fastening of the cover to the rim of the vessel around each of the openings by mechanical fasteners such as self-tapping screws. These depressions in the upper wall are fused during molding with the lower wall to enhance the strength of the cover around its circumferentially extending margin. The lower wall has a circumferentially extending frustoconical surface proximate the margin which aids in positioning the cover onto the rim of the portal and in the distribution of loads onto the vessel. In addition, a plurality of radially extending circumferentially spaced indentations are formed in the lower wall of the cover which are fused with the adjacent upper wall. These indentations provide additional strength for the cover to resist loads placed on the upper wall and help the cover to resist deformation of the rim of the portal due to horizontal forces such as impacts from machinery or thermal stresses.

The riser is configured with inwardly projecting lugs on the bottommost connector portion which are similar to those provided on the cover, and the portal also includes receivers adjacent a surrounding rim which are configured to receive the lugs of either the bottommost portion of the riser or the cover. Further, the riser is provided with at least one and preferably a plurality of circumscribing shoulders which present flanges oriented radially with respect to the longitudinal axis of the riser. The shoulders are substantially frustoconical in shape to mate with the rim of the portal and are, as a result, largely self-centering. The flanges are continuous and uninterrupted, and substantially horizontal and sized and configured complementally with respect to the rim surrounding the opening, whereby the flanges may mate with the rim when the riser is trimmed adjacent one of the flanges. A circumferentially extending seal may be provided by a bead of elastomeric sealant in a circumferentially extending slot in the rim, whereby either the cover, the bottommost portion of the riser or, when trimming of the riser has taken place, the bottommost flange may mate with the seal. The synthetic resin material of the riser permits trimming to appropriate lengths at intervals along the axial length where the flanges are provided. The riser may be held in place by mechanical fasteners such as self-tapping screws. Thus, if the grade of the earth around the tank may be estimated as falling within the initial axial length of a riser, only a single riser need be provided at the site which may then be trimmed to place the cover at or very near the grade.

These and other advantages of the present invention will be appreciated by those skilled in the art with reference to the drawings and description which follow.

DESCRIPTION OF THE PREFERRED EMBODIMENT

Figure 2:
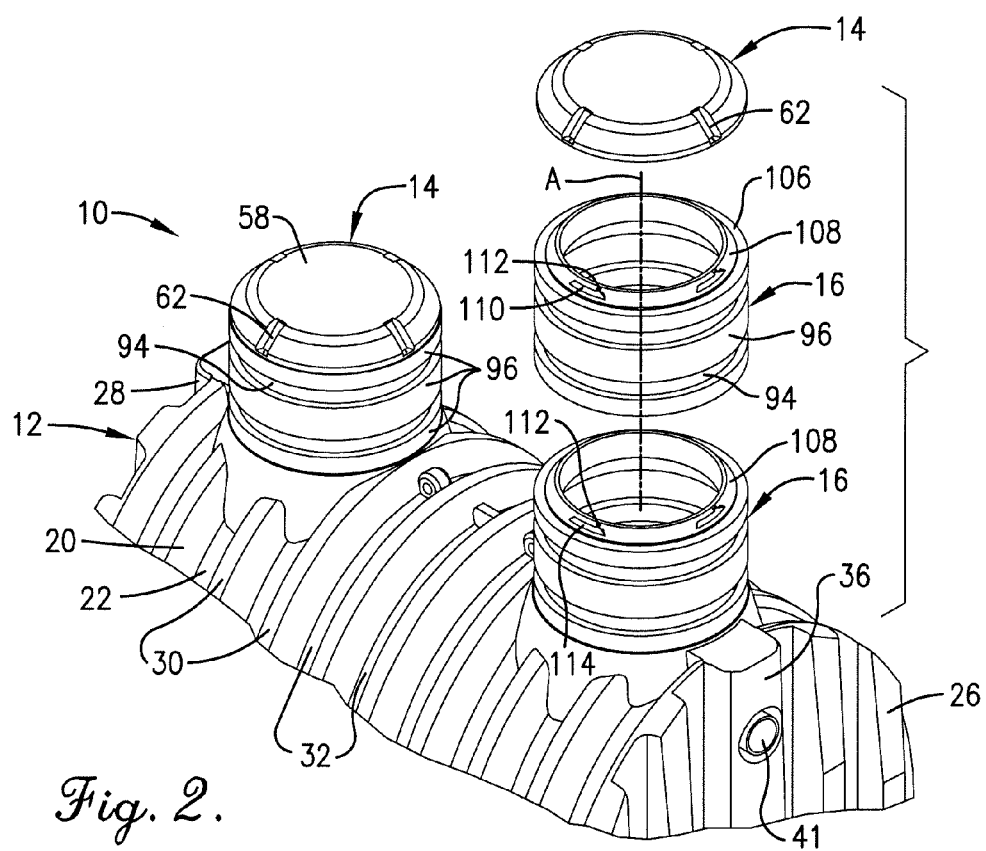
FIG. 2 is a fragmentary, exploded view of the subterranean lank shown in FIG. 1 having a riser in accordance with the present invention coupled to the rim of the portal surrounding each of the openings of the tank and another riser and cover shown in detached position.

Referring now to the drawings, a subterranean tank assembly 10 in accordance with the present invention broadly includes a vessel 12 and a cover 14, and as shown in FIG. 2, a riser 16 which may be coupled to the vessel 12 intermediate the vessel and the cover 14. A plurality of risers 16 may be connected together to provide a riser assembly 18 which effectively raises the placement of the cover 14 relative to the top of the vessel 12.

Figure 1:
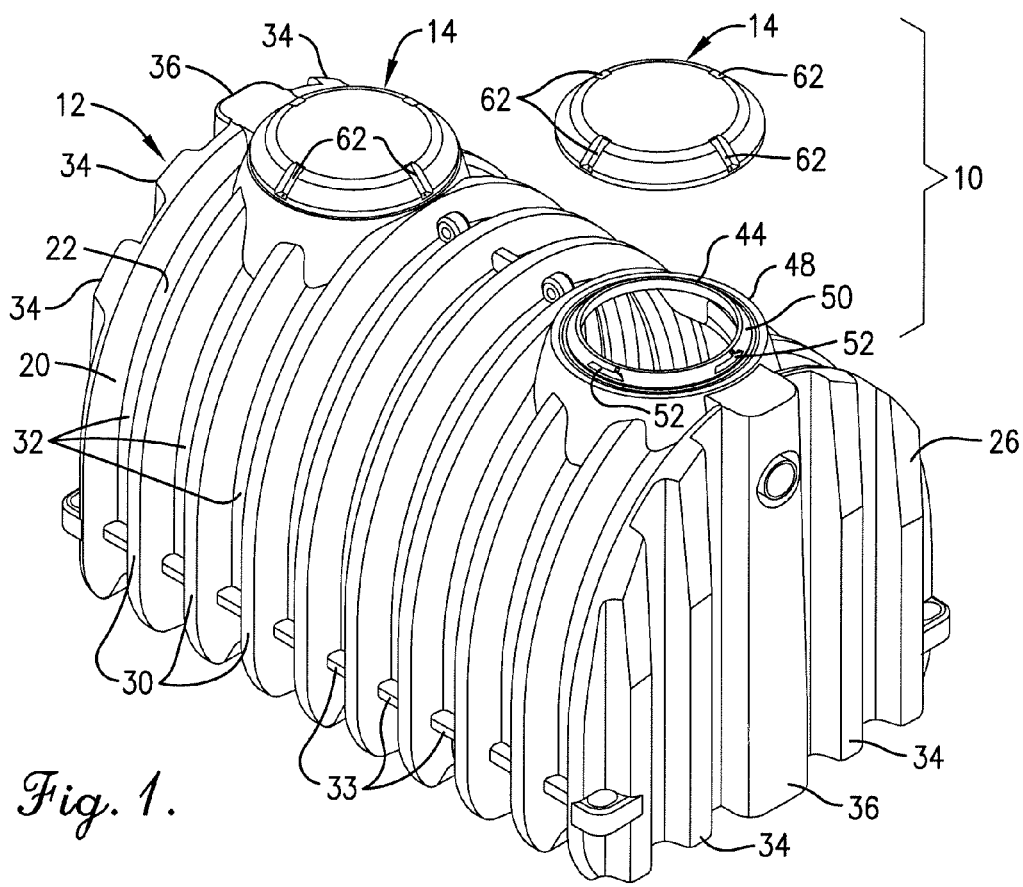
FIG. 1 is an exploded, perspective view of the subterranean tank of the present assembly showing the vessel with one of its two covers detached.
Figure 3:
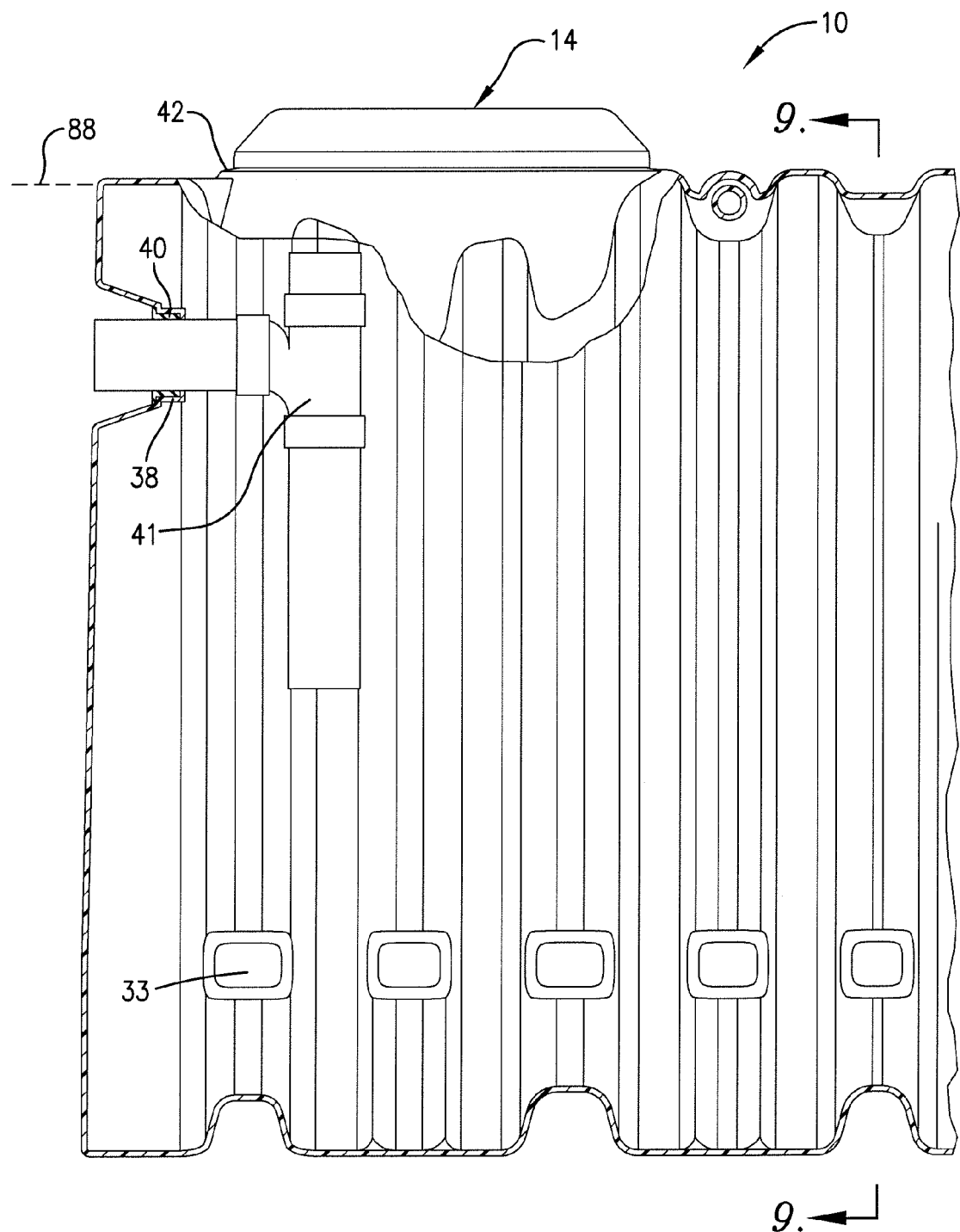
FIG. 3 is an enlarged, fragmentary, vertical elevational view in partial section along the longitudinal axis of the vessel showing one of the passages and piping and reinforcements between adjacent ribs of the vessel wall.
Figure 9:
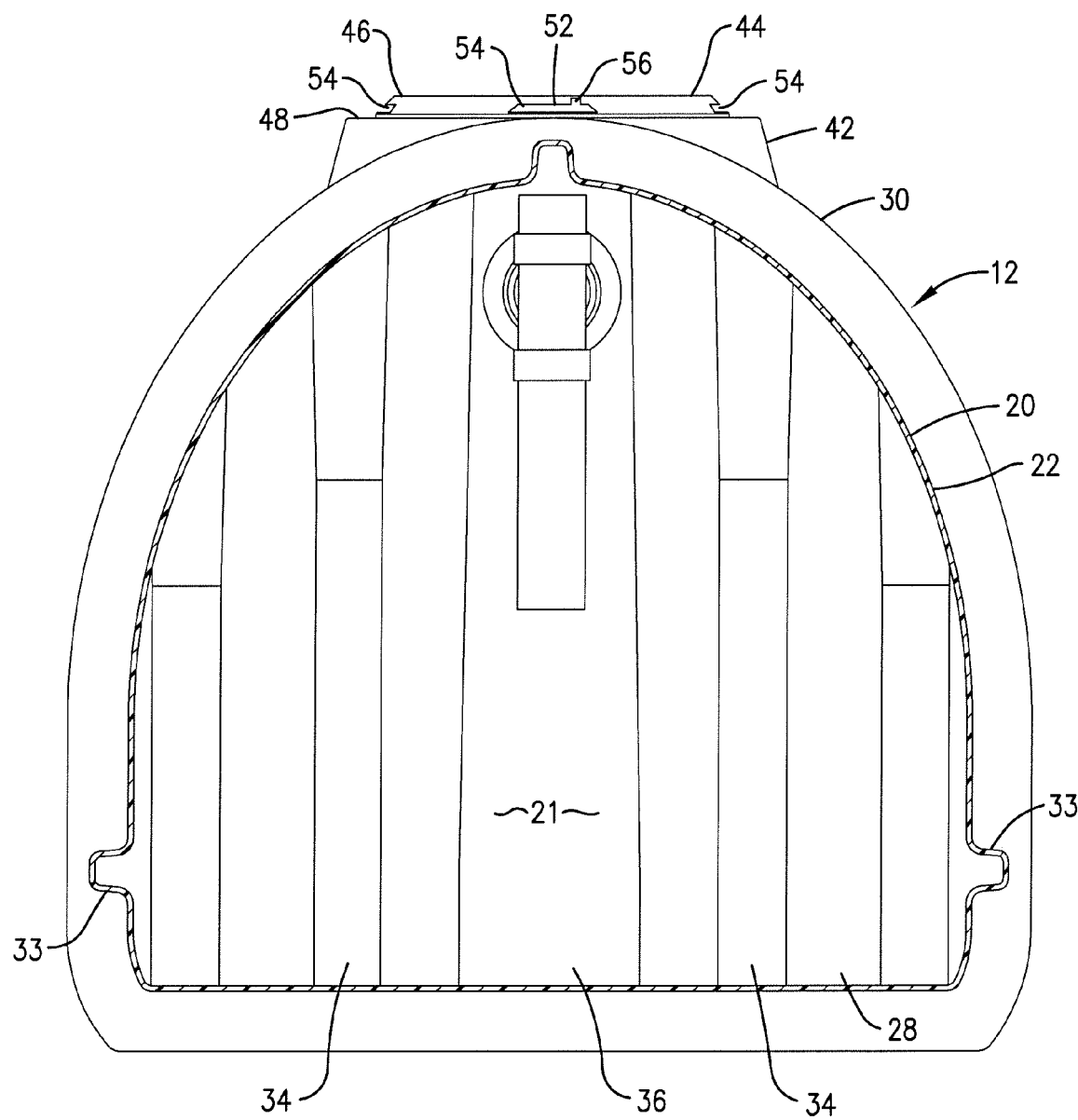
FIG. 9 is a vertical sectional view taken through one of the connecting wall flat sections substantially longitudinally centered between the end walls along line 9—9 of FIG. 3 through a flat connecting wall between corrugations in the vessel wall showing the parabolic configuration of the top wall portion.

In greater detail, the vessel 12 as shown in FIGS. 1 and 2, in a partial sectional view in FIG. 3, and in vertical section in FIG. 9 includes a vessel wall 20 defining a chamber 21 and having a parabolic top wall portion 22, a substantially horizontal bottom wall portion 24, and upright end walls 26 and 28. The vessel 12 extends longitudinally between the end walls. The vessel wall 20 is preferably rotationally molded of synthetic resin such as high-density linear polyethylene. The top wall portion 22 is substantially parabolic in configuration, whereby the load imposed on the vessel wall 20 by the covering earth is more evenly distributed and carried by the bottom wall portion 24. A parabola is the locus of a point which is equidistant from a fixed straight line and a line not on this point. The arcuate top wall portion 22 includes a plurality of substantially parabolic corrugations 30 which are integrally molded with and alternate with connecting wall flat sections 32 which are also parabolic and complemental in shape to the corrugations 30. The corrugations 30 are designed to maximize section modulus and the large radius of the arcuate corrugations 30 enable the vessel wall to be formed with a uniform and consistent wall thickness. The general shape of the top wall portion 24 including the corrugations 30 and alternating connecting wall flat sections 32 when viewed along the longitudinal axis of the vessel 12 as seen in FIG. 9 is generally parabolic, which as used herein includes a modified ellipsoid. Bracing ribs 33 are located along each side of the top wall portion 22 proximate to the bottom wall portion 24. Further, each of the end walls 26 and 28 have upright side corrugations 34 and a center corrugation 36 having a passage 38 which includes a gasket 40 and receives a tubular T-shaped pipe 41 therethrough.

The top wall portion 22 includes a portal 42 sized to admit the passage of a human into the vessel 12 through an opening 44. A rim 46 surrounds and defines the opening 44. The rim 46 includes a substantially horizontal circumferentially extending normally upwardly facing substantially flat closure surface 48 and a frustoconically shaped upwardly and inwardly tapering receiving surface 50 positioned radially inward and normally extending upward from the closure surface 48. The receiving surface 50 includes a plurality of circumferentially spaced recesses 52 therein, 0 the recesses 52 each having a substantially horizontal circumferentially extending slot portion 54 and a substantially vertical slot portion 56 extending upwardly and communicating with the horizontal slot portion 54, the radial depth of the vertical slot portion 56 progressively decreasing in an upward direction. The receiving surface 50 is configured complementally with the cover 14 as described below to facilitate positioning of either the cover or the riser 16 onto the rim 46.

Figures 4, 5, 6:
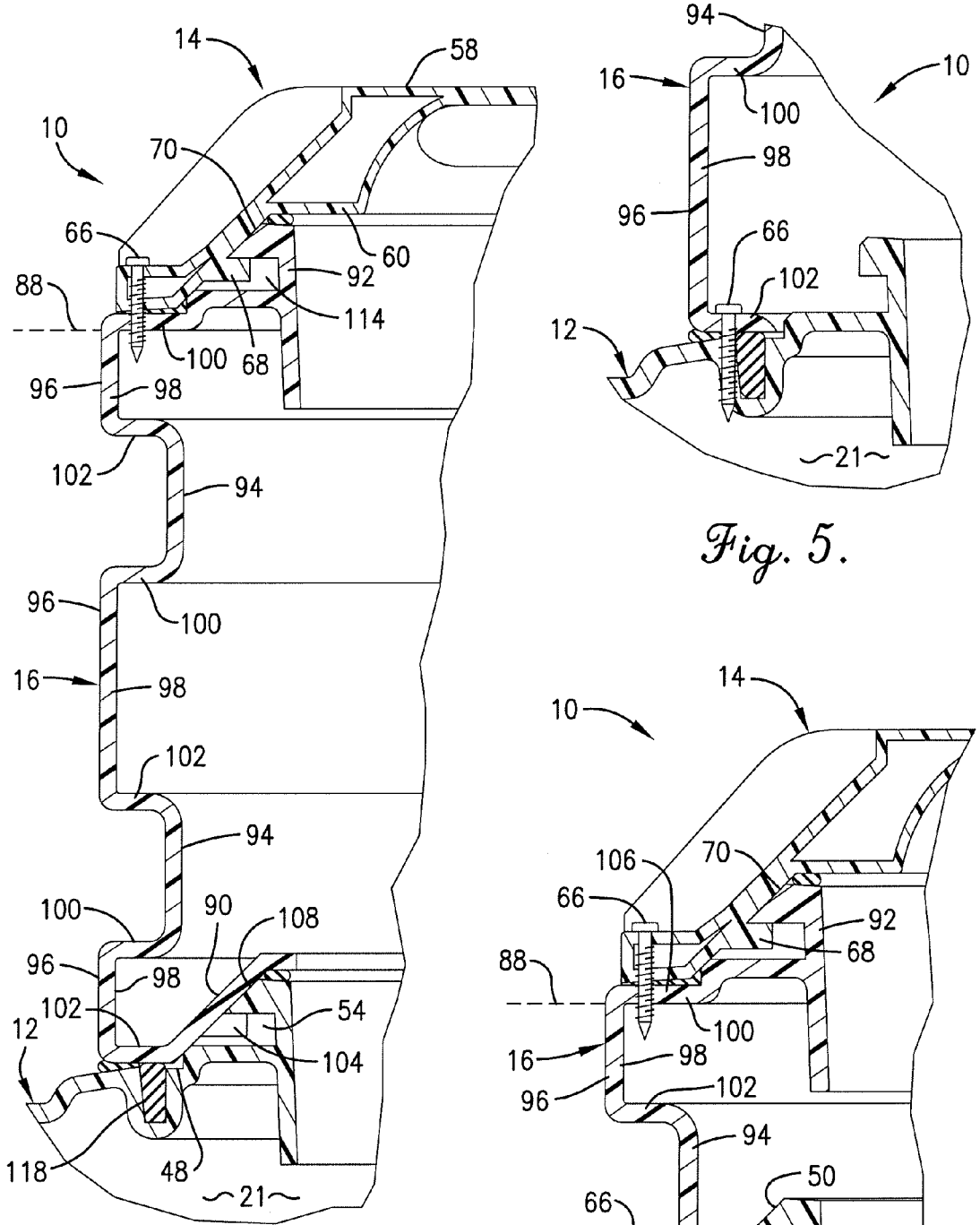
FIG. 4 is an enlarged, fragmentary, vertical cross-sectional view of the cover, riser and rim of the vessel with the riser in an untrimmed full length condition.
FIG. 5 is an enlarged, fragmentary, vertical cross-sectional view similar to FIG. 4 showing the riser trimmed to a portion of its original length adjacent a flange extending inwardly from an outer rib wall of the riser and fastened to the rim of the vessel.
FIG. 6 is an enlarged, fragmentary, vertical cross-sectional view similar to FIG. 5 but showing the riser trimmed to a portion of its original length adjacent a flange extending outwardly from an inner riser wall and fastened to the rim of the vessel.
Figure 8:
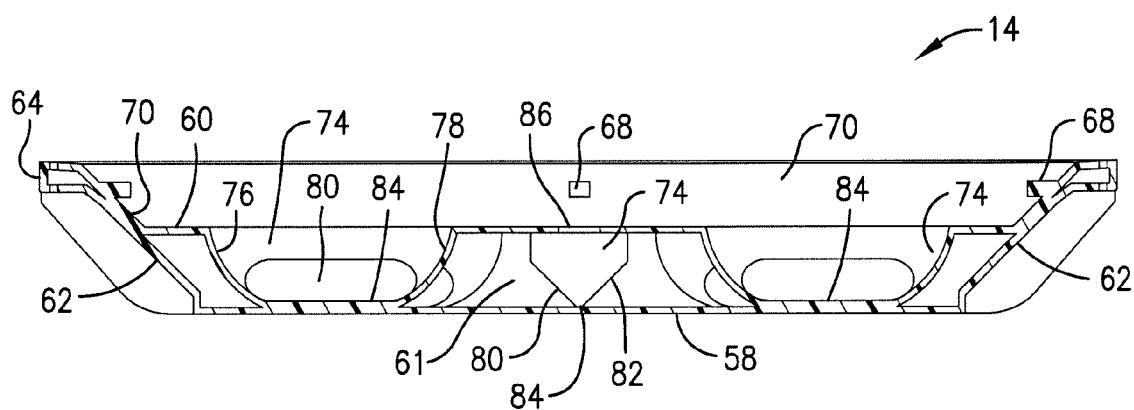
FIG. 8 is an enlarged, vertical cross-sectional view of the cover in an inverted position taken along line 8—8 of FIG. 7 showing the fused surfaces of the upper and lower walls at the depressions and indentations and the cross-sectional configuration of the indentations.

The cover 14 is preferably rotationally molded of synthetic resin such as high-density linear polyethylene and includes an upper wall 58 and a lower wall 60 spaced from one another along at least a part of each the upper wall and lower wall to present a cavity 61 therebetween as shown in FIG. 8. The double wall construction of the cover 14 provides improved impact resistance and thermal insulation as well as improving the strength and sealing capabilities of the cover 14. The upper wall 58 is generally flat or dome-shaped and includes a plurality of circumferentially spaced depressions 62 adjacent the circumferentially extending edge 64 connecting the upper wall 58 and the lower wall 60. The depressions 62 aid both in seating, opening and closing the cover 14, and also aid in the use of mechanical fasteners 66 such as self-tapping screws which may be drilled through the cover 14 in the depressions 62 and into the rim 46 as shown in FIGS. 4 and 6.

Figure 7:
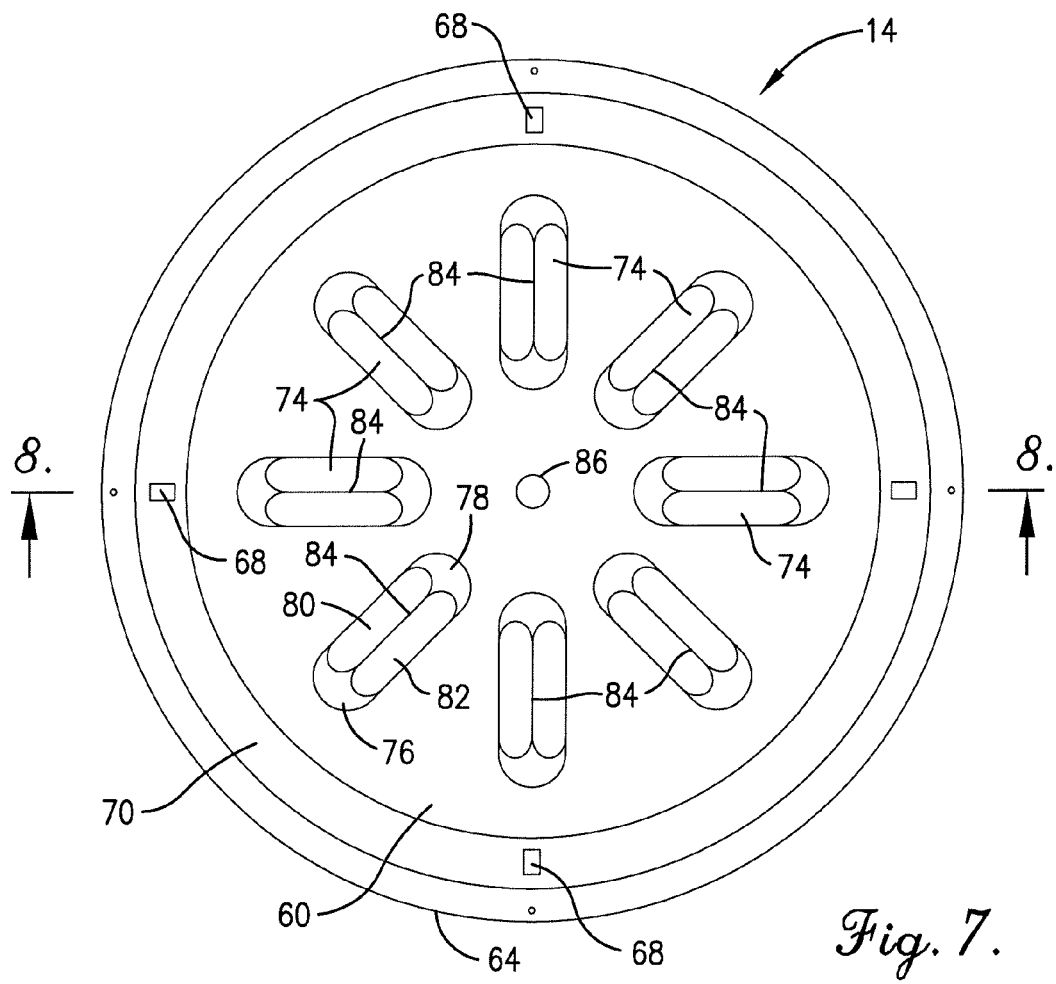
FIG. 7 is an enlarged, bottom plan view of the cover showing circumferentially spaced lugs on the lower wall and a plurality of radially extending circumferentially arrayed indentations in the lower wall radially inboard of the frustoconical surface.

The lower wall 60 of the cover 14 is complementally configured to the rim 46 and includes a plurality of circumferentially spaced lugs 68 positioned on an inwardly tapered, inclined, generally frustoconically shaped mating surface 70. The mating surface 70 is complementally shaped to the receiving surface 50 so that the cover 14 is essentially self-centering on the rim of the portal, and the lugs 68 are sized and spaced to mate and fit into the recesses 52 whereby the cover 14 may be locked into engagement with the portal. Further, the depressions 62 are molded as kiss-offs whereby the upper wall 58 and the lower wall 60 are fused together during molding in the area of the depressions 62 to enhance the structural strength of the cover 14 around its circumferentially extending edge 64. As shown in FIGS. 7 and 8, the lower wall 60 includes a plurality of radially extending, circumferentially arrayed indentations 74. The indentations 74 include cup shaped end portions 76 and 78 and substantially planar pitched portions 80 and 82 which intersect along a peak 84. The peak 84 is designed as a kiss-off during molding, wherein the lower wall 60 and upper wall 58 are fused therealong as shown in FIG. 8. The indentations 74 thus enhance the strength of the cover 14 by virtue of the provision of load transfer being the upper wall 58 and the lower wall 60 when forces are applied downwardly to the upper wall 58, both by the cup shaped end portions and planar pitched portions and also by virtue of the fact that the upper wall 58 and the lower wall 60 are effectively welded together along the peak 84 of each of the indentations 74. A hole 86 is centrally positioned in the lower wall 60 which faciliates drainage of any condensed moisture between the upper and lower walls of the cover 14, but may be covered if desired, especially in cold environments.

The subterranean tank assembly 10 is designed to be placed into a pit or depression in the earth 88 whereby earth may cover the vessel 12. Depending on the grade of the earth around the vessel 12, the cover 14 may be secured directly to the portal 42 as shown in FIG. 1, but it is often necessary to employ one or a plurality of risers 16 as shown in FIG. 2 to effectively raise the height whereby entry may be gained into the vessel 12 for filling or emptying the chamber, inspection of the vessel 12, or repair. The riser 16 normally is positioned so that its longitudinal axis A is upright. The riser 16 is tubular and includes a normally bottommost connector portion 90 and a normally topmost connector portion 92, with at least one a preferably a plurality of continuous, flat, circumferentially extending inner riser walls 94 and a plurality of ribs 96. The ribs 96 each include a continuous, smooth and uninterrupted outer wall 98 of continuous thickness and a pair of axially spaced flanges 100 and 102. The flanges 100 and 102 extend radially outwardly from the inner riser walls 94 and connect them with the outer wall 98 of the rib 96, the flanges 100 and 102 each extending continuously and circumferentially around the riser 16 and being of constant thickness, the flanges further extending radially substantially perpendicular to the riser longitudinal axis A. The outer wall 98 of the ribs 96 is spaced outwardly of the inner riser walls 94 such that the flanges 100 and 102 extend outwardly a sufficient distance to mate with the closure surface 48 when the riser 16 is connected to the portal 42, and the inner riser walls 94 are of a sufficient diameter to clear the receiving surface 50 of the portal as shown in FIG. 6. The bottommost connector portion 92 is configured substantially the same as the lower wall 60 of the cover 14, and includes circumferentially spaced, inwardly oriented lugs 104, and the topmost connector portion 90 is configured substantially the same as the rim 46 of the portal 42. The topmost connector portion 90 thus also includes a substantially horizontal circumferentially extending normally upwardly facing closure surface 106 and a frustoconically shaped inwardly tapering receiving surface 108 radially inward and normally extending upward from the closure surface 106. The receiving surface 108 includes a plurality of circumferentially spaced recesses 110 therein, the recesses 110 each having a substantially horizontal circumferentially extending slot portion 112 and a substantially vertical slot portion 114 extending upwardly and communicating with the horizontal slot portion 112, the radial depth of the vertical slot portion 114 progressively decreasing in an upward direction. Thus, the topmost connector portion 92 may receive a cover 14 or another riser 16 thereon, while the bottommost connector portion 94 may mount on the portal 42 or to the topmost connector portion 92 of another riser 16.

The closure surface 48 of the rim 46 preferably includes a circumferentially extending slot 116 spaced radially outward from the receiving surface 50 and into which a circumferentially extending seal 118 of elastomeric material such as synthetic rubber may be placed. The seal 118 is positioned to engage the lower wall 60 of the cover 14, or alternatively the bottommost connector portion 94 of a riser 16 or a flange 100 or 102. Additionally beads of sealant 120 may be applied of resilient sealant such as silicone rubber may be applied to one of the portal 42, the riser 16 or the lower wall 60 of the cover radially inwardly of the seal 118 as shown in FIGS. 4, 5 and 6.

The vessel 12, the cover 14 and the risers 16 are preferably rotationally molded in the configuration as set forth herein. After the seal 98 is positioned, the assembly 10 is ready for installation. A pit or depression is dug of sufficient depth to permit the top wall portion 24 of the vessel 12 to be covered with earth when the assembly 10 is lowered into the pit and the vessel 12 is covered. Gravel or sand is deposited into the pit to provide a base for the tank assembly 10, and the vessel 12 is then lowered into place (such as by a crane connected to carrying eyes on the vessel wall) and leveled. Water or other liquid may be introduced into the excavated opening to aid in settling of the vessel 12, and gravel or earth placed around the vessel wall. The pit is filled with earth and the pipe 41 connected to a sewage field or the like. The earth is then graded over the vessel 12 consistent with the surrounding grade. The covers 14 may be directly fitted onto the rims of the portals, or one or a plurality of risers 16 may be used to adjust the height relative to the vessel 12 where the cover 16 will be positioned. Because the risers 16 are of a predetermined height, the surrounding grade may necessitate only a fraction of the height of a riser 16 to effectively position the cover 14 at grade level.

The riser 16 may be trimmed to a desired axial length at intervals adjacent the flanges 100 and 102. The riser 16 may be cut to length through either the outer wall 80 of the ribs as shown in FIG. 6 or through the inner wall 76 as shown in FIG. 5. Where the vertical length of the outer wall 98 of the ribs 96 is a multiple of 2 inches (some outer walls may be 2 inches vertically and others may be 4 inches, etc.), and the riser inner wall 94 is a multiple of 2 inches, this permits effective adjustment of the height of the riser 16 in even increments which are a fraction of the overall length of the riser. Because the flanges 100 and 102 are sized and configured to mate with the closure surface 48 of the rim and of sufficient length to engage the seal 118, the trimmed riser 16 as shown in FIGS. 5 and 6 may be placed directly on the closure surface 48 and screwed thereto to hold the riser in place. The riser 16 is preferably trimmed from the top up; that is to say, the topmost connector portion 90 remains with the riser 16 while the bottommost connector portion 92 is removed with the trimmed portion. This permits the cover 14 to mate with and lock into the topmost connector portion 90, which, as noted above, includes the frustoconical receiving surface 108 so that the cover 14 readily positions itself in proper alignment on the riser 16.

By providing a riser 16 which may be trimmed to shorten its axial length, only one standard size of riser 16 need be supplied at the job site. This avoids the requirement of keeping several different risers of different lengths on hand to provide the cover at ground level. Because the riser 16 may be trimmed at various locations along its length by virtue of the provision of multiple flanges complementally sized with the receiving surface 50, the subterranean tank assembly 10 in accordance with the present invention advantageously may very closely position the cover 14 at the desired height relative to the surrounding grade of the earth.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. A subterranean tank assembly for storing liquid below grade, said tank assembly comprising:

a vessel having a vessel wall of molded synthetic resin material defining a liquid-receiving chamber therein and at least one portal projecting generally upwardly from the vessel wall and presenting an opening for gaining access to the chamber, said portal including a rim having a substantially horizontal circumferentially extending closure surface in surrounding relationship to the opening and an inwardly tapering receiving surface;

a cover of synthetic resin material; and a riser of synthetic resin material for coupling to and elevating the cover to a position at or above grade and positioned intermediate said rim and said cover, said riser being substantially tubular and presenting a normally upright longitudinal axis and including a normally bottommost connector portion adapted for coupling to said rim, said connector portion also including an inwardly tapering surface complementally configured for mating with said receiving surface of said vessel in sealing engagement, a normally topmost connector portion adapted for coupling to said cover, at least one continuous and uninterrupted cylindrical riser wall, and a plurality of axially spaced continuous and circumscribing ribs positioned radially outward of said riser wall, each of said ribs including a pair of substantially horizontal flanges radially oriented in a plane transverse to the longitudinal axis of the riser and connecting said ribs to said riser wall, said flanges each being complementally sized and configured relative to said rim whereby said a circumscribing cut through one of said ribs or said riser wall adjacent said flange will reduce the longitudinal length of said riser and whereby the remaining, normally bottommost flange of the riser may be coupled to the rim in sealing engagement.

2. A subterranean tank assembly as set forth in claim 1, wherein said cover includes an interior wall surface having at least one lug oriented substantially radially inwardly and said rim includes an outer wall surface having at least one recess complementally configured to receive said lug.

3. A subterranean tank assembly as set forth in claim 1, wherein said rim includes a circumferentially extending elastomeric seal surrounding said opening and positioned for engagement with either said bottommost connector portion or, when said bottommost connector portion has been removed from said riser, the bottommost flange of the riser.

4. A subterranean tank assembly as set forth in claim 3, wherein said rim includes a circumferentially extending slot for receiving a part of said seal therein.

* * * * *